H. SIMKE & J. A. STELLER.
TIME CONTROLLED CUT-OFF VALVE FOR GAS RANGES.
APPLICATION FILED APR. 6, 1915.
1,178,272.    Patented Apr. 4, 1916.
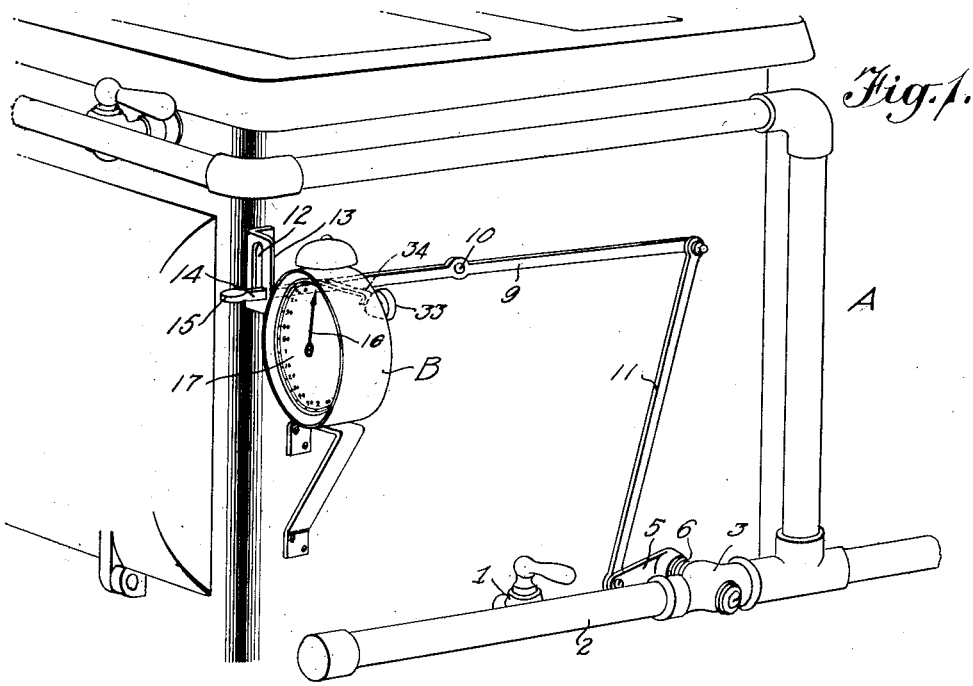
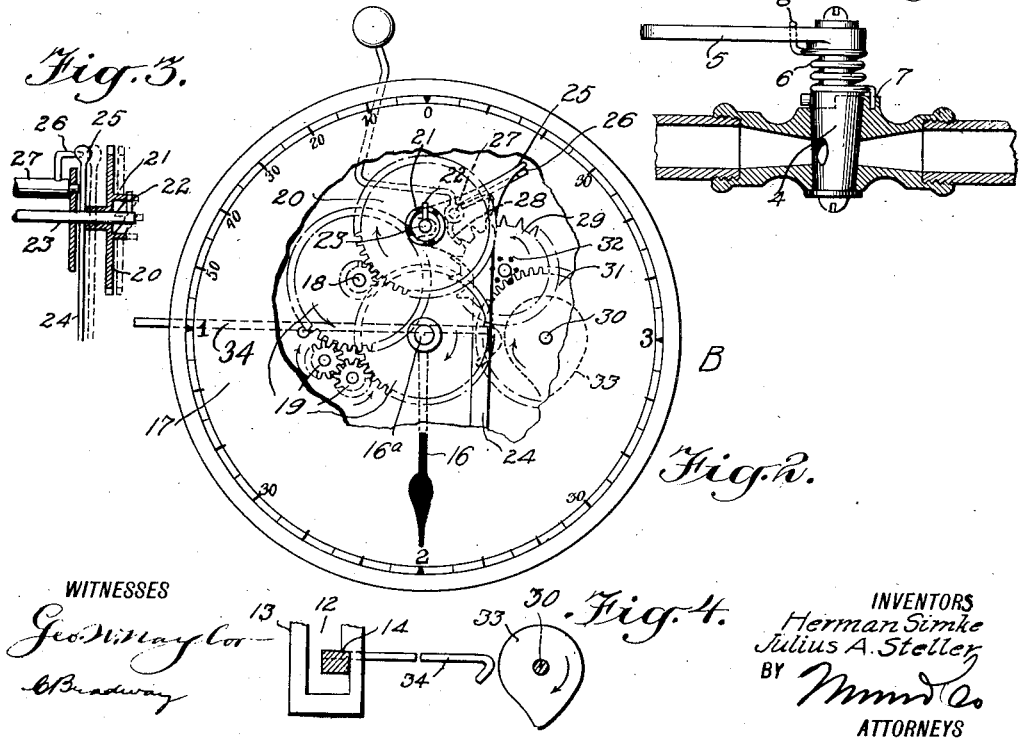
WITNESSES
INVENTORS
Herman Simke
Julius A. Steller
BY
ATTORNEYS

UNITED STATES PATENT OFFICE.

HERMAN SIMKE AND JULIUS A. STELLER, OF BLOOMINGTON, ILLINOIS.

TIME-CONTROLLED CUT-OFF VALVE FOR GAS-RANGES.

1,178,272.   Specification of Letters Patent.   Patented Apr. 4, 1916.

Application filed April 6, 1915. Serial No. 19,532.

*To all whom it may concern:*

Be it known that we, HERMAN SIMKE and JULIUS A. STELLER, citizens of the United States, and residents of Bloomington, in the county of McLean and State of Illinois, have invented a new and Improved Time-Controlled Cut-Off Valve for Gas-Ranges, of which the following is a full, clear, and exact description.

This invention relates to time-controlled valves and has to deal more particularly with a gas cut-off valve for ranges, although the invention may be applied to other uses.

The invention has for its general objects to improve and simplify the construction and operation of clock-controlled valves so as to be reliable and efficient in use, comparatively simple and inexpensive to manufacture, and so designed that when applied to a gas range it is possible to heat the range for a predetermined time, and when the time limit is reached the clock will automatically effect the closing of the gas valve to stop the heating of the range.

A more specific object of the invention is the provision of a simple, novel and effective clock-actuated mechanism operatively connected with the cut-off valve, said mechanism being capable of being set for actuation after the lapse of a predetermined interval of time, according to the nature of the food to be baked or roasted.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the upper portion of a gas range with the invention applied thereto; Fig. 2 is a front view of the clock with a portion of the dial broken away to show the internal structure; Fig. 3 is a detail sectional view of the releasing device for the trip mechanism; Fig. 4 is a detail sectional view of the tripping mechanism; and Fig. 5 is a sectional view of the gas cock or cut-off valve.

In the present instance the invention is shown applied to a gas range to control the heating of the oven thereof, but it is to be understood that the automatic valve-operating mechanism can be applied to other apparatus.

Referring to the drawing, A designates a gas range to the oven of which gas is supplied through a cock 1 that is connected with a supply pipe 2, there being in the supply pipe an automatic cut-off valve or cock 3 of any desired design. The valve in the present instance comprises a casing having a ported plug 4 rotatably mounted therein, and in the stem of this plug is a crank arm 5 which is under the influence of a helical spring 6 coiled around the stem of the plug and connected at 7 with the casing of the valve and connected at 8 with the crank or arm 5. A lever 9 is fulcrumed at 10 on the side of the gas range and the rear end of this lever is connected by a link 11 with the valve arm 5. The front end of the lever 9 passes through a slot 12 in a guide 13 which is fixed on the range, the lower end of the slot being off-set to form a catch 14 with which the lever 9 engages when the valve 3 is open to supply gas to the range oven. The front end 15 of the lever terminates in a knob or equivalent device which is depressed to open the valve 3, and when it is fully depressed the lever snaps under the shoulder 14 in the guide 13, and in this manner the valve is locked open.

To effect the automatic closing of the valve 3 a clock B is associated with the lever 9 to release the same from the catch 14, whereby the spring 6 of the valve 3 will cause the plug 4 to turn to a position for cutting off the flow of gas. The clock B includes a single hand 16 which moves over a dial 17 so divided that the hand in making one revolution will indicate the lapse of four hours of time, which is a period long enough to bake or cook ordinary food, but of course the range of the clock can be changed according to any given requirements.

The clock is adapted to be set by moving the hand from the zero to any point on the dial representing a desired period of time which must elapse before the clock "goes off" to effect the closing of the gas cock 3. Thus, in Fig. 2, the hand is turned clockwise from zero and set at the second hour number, which means that after the passage of two hours the hand will be at zero, and on reaching this point the lever 9 will be tripped and the gas valve closed. The hand 16, instead of making one revolution in twelve hours, as in an ordinary clock, makes a revolution in four hours. It is driven from a spring-actuated shaft 18 through a train of gearing 19, designed for this purpose. Also driven from the same shaft 18 is a gear wheel 20 which controls the actuation of the trip mechanism. This wheel 20 makes one third turn for every complete revolution of the shaft 18 or hand 16, and on the hub of the wheel 20 are 3 ratchet teeth 21 with which engages a pin or pawl 22 on a shaft 23. It is clear that the alarm is to be sounded at a determined point in the revolution of the hand 16. This hand, however, revolves three times while the wheel 20 revolves once. Consequently, three tripping teeth 21 are required, equidistant from each other, and adapted to act, one for each revolution of the hand 16. The wheel 20 is free to rotate and slide axially on the shaft 23 and in so doing it operates a spring catch 24, the free extremity 25 of which is adapted to engage an L-shaped finger 26 on a shaft 27. This shaft 27 has escapement dogs 28 which engage with an escapement wheel 29, the latter being driven from a spring-actuated shaft 30 through a gear 31 and pinion 32. On the rear end of the shaft 30 is a cam 33 which in rotating is adapted to wipe on a lateral finger 34 carried by the forward portion of the lever 9, whereby the cam will move the lever in a direction to disengage it from the stop or shoulder 14 for the purpose of permitting the gas valve to close.

Assuming that the indicator or hand 16 has been turned to the second hour on the face or dial 17, this setting being effected by the turning of a knob on the rear end of the central shaft 16ª, as the time passes the hand 16 will move toward zero in a clockwise direction and at the same time the gear 20 will rotate and cause one of the ratchet teeth 21 to ride on the pin 22, and when the pin reaches the edge of the ratchet tooth and passes off the same the releasing spring 24 will move to the dotted line position, Fig. 3, and thereby release the finger 26. The alarm mechanism of the clock is now operated through its usual spring and train of gears and the cam 33 turns and trips the lever 9, it being assumed of course that the alarm spring has previously been wound. To enable the hand 16, and with it the gear 20 and the alarm mechanism, to be set for the desired time, a slip joint is provided between the spring driven shaft 18 and the gearing 19 driving the hand and the alarm cam.

From the foregoing description taken in connection with the accompanying drawing, the advantages of the construction and method of operation will be readily understood by those skilled in the art to which the invention appertains, and while we have described the principle of operation, together with the apparatus which we now consider to be the best embodiment thereof, we desire to have it understood that the apparatus shown is merely illustrative and that such changes may be made when desired as fall within the scope of the appended claims.

Having thus described our invention, we claim as new and desire to secure by Letters Patent:

1. The combination of a valve, means tending to move the valve to a given position, a lever connected with the valve for holding the same out of such given position, said lever having an extremity capable of a limited lateral movement, a stationary catch with which the said extremity of the lever engages or disengages by lateral movement, the lever being normally urged in a direction to maintain its engagement with the catch, and a clock mechanism including a device for moving the catch-engaging extremity of the lever out of engagement with the catch to permit the valve to move.

2. The combination of a valve, a spring tending to move the same, an arm connected with the valve, a lever linked to the arm, a stationary catch having a shoulder with which the lever is engaged by a movement transverse to the plane in which the lever swings to hold the valve in a given position against the tension of the said spring, and a clock-actuated device for releasing the lever from the said clutch.

3. A time-controlled valve mechanism and a clock controlling the same, said clock including a hand adapted to be set to any desired point, a dial over which the hand moves, a spring-actuated train of gears for moving the hand, a rotary element operatively connected with the said train of gears to move synchronously therewith and having ratchet teeth, a pin engaging the ratchet teeth for causing axial movement of the said element during its rotation, a resilient catch controlled by the said element, a spring-actuated cam, means normally engaged by the resilient catch to prevent the cam from actuating except when the pin rides off the ratchet wheel after the lapse of a predetermined period of time, and means actuated by the cam for releasing the valve mechanism.

In testimony whereof we have signed our names to this specification in the presence of two subscribing witnesses.

HERMAN SIMKE.
JULIUS A. STELLER.

Witnesses:
A. W. MEADOWS,
ROLLA NEAL.